(12) United States Patent
Matheswaran et al.

(10) Patent No.: US 11,740,652 B2
(45) Date of Patent: Aug. 29, 2023

(54) METHOD FOR SYNCHRONIZING CLOCKS OF AT LEAST TWO DEVICES

(71) Applicant: Volkswagen Aktiengesellschaft, Wolfsburg (DE)

(72) Inventors: Arul Matheswaran, Herne (DE); Jürgen Elberich, Wuppertal (DE); Rijo Varghese, Bochum (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 51 days.

(21) Appl. No.: 17/544,183

(22) Filed: Dec. 7, 2021

(65) Prior Publication Data

US 2022/0179447 A1  Jun. 9, 2022

(30) Foreign Application Priority Data

Dec. 7, 2020 (DE) ...................... 10 2020 215 441.4

(51) Int. Cl.
*G06F 1/12* (2006.01)

(52) U.S. Cl.
CPC ...................... *G06F 1/12* (2013.01)

(58) Field of Classification Search
CPC ...................... G06F 1/32; G06F 9/44
See application file for complete search history.

(56) References Cited

U.S. PATENT DOCUMENTS

| 7,623,552 | B2 | 11/2009 | Jordan et al. ............ 370/503 |
| 9,231,936 | B1 | 1/2016 | Wang et al. |
| 9,288,048 | B2 | 3/2016 | Han et al. |
| 9,331,838 | B2 | 5/2016 | Nöbauer et al. |
| 9,881,165 | B2 | 1/2018 | Litichever et al. |
| 10,630,481 | B2 | 4/2020 | Lawlis et al. |

(Continued)

FOREIGN PATENT DOCUMENTS

| CN | 107770176 A | 3/2018 | ............ H04L 12/40 |
| DE | 102014214823 A1 | 2/2016 | ............... H04L 7/04 |

(Continued)

OTHER PUBLICATIONS

Extended European Search Report, Application No. 21209439.5, 5 pages, dated May 6, 2022.

(Continued)

*Primary Examiner* — Keshab R Pandey
(74) *Attorney, Agent, or Firm* — Slayden Grubert Beard PLLC (57) ABSTRACT

A method for synchronizing clocks of at least two devices in a distributed network of a vehicle, comprising: establishing unencrypted communication between the at least two devices to determine a temporal difference between the clocks of the two devices, exchanging messages between the at least two devices via the unencrypted communication, ascertaining a temporal difference between the clocks of the at least two devices using the messages, establishing encrypted communication between the at least two devices to authenticate the exchange of messages, authenticating the messages that were used to ascertain the temporal difference, using the ascertained temporal difference, when the authentication of exchanged messages has been completed successfully.

23 Claims, 2 Drawing Sheets

(56) References Cited

U.S. PATENT DOCUMENTS

| | | | | |
|---|---|---|---|---|
| 2005/0221797 A1* | 10/2005 | Howard | ............ | H04W 12/037 |
| | | | | 455/411 |
| 2016/0248577 A1* | 8/2016 | Ilyas | .................... | H04J 3/0667 |
| 2016/0380770 A1* | 12/2016 | Whitmer | ................ | G06F 21/64 |
| | | | | 713/181 |
| 2018/0004956 A1* | 1/2018 | Bertorelle | ........... | H04L 63/0853 |
| 2019/0245690 A1* | 8/2019 | Shah | ..................... | H04J 3/0667 |

FOREIGN PATENT DOCUMENTS

| | | | | |
|---|---|---|---|---|
| DE | 102014217993 A1 | 3/2016 | ............... | H04L 7/04 |
| EP | 2395404 A1 | 12/2011 | ............ | H04L 29/06 |
| EP | 2786513 B1 | 5/2020 | ................ | H04J 3/06 |
| WO | 2017/036768 A1 | 3/2017 | ............... | H04L 9/12 |

OTHER PUBLICATIONS

German Office Action, Application No. 102020215441.4, 8 pages, dated Sep. 3, 2021.

* cited by examiner

METHOD FOR SYNCHRONIZING CLOCKS OF AT LEAST TWO DEVICES

CROSS-REFERENCE TO RELATED APPLICATIONS

This application claims priority to German Patent Application No. DE 10 2020 215 441.4, filed on Dec. 7, 2020 with the German Patent and Trademark Office. The contents of the aforesaid Patent Application are incorporated herein for all purposes.

TECHNICAL FIELD

The invention relates to a method for synchronizing clocks of at least two devices, for example control devices, in a distributed network of a vehicle. The invention also relates to a corresponding computer program product for performing such a method when executed on a processor of a control unit of the vehicle. The invention furthermore relates to a corresponding network for a vehicle. In addition, the invention relates to a corresponding vehicle with a corresponding network.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Modern vehicles often comprise multiple devices such as control devices that assume the electronic control of driver assistance systems, safety systems, comfort functions, etc. The control devices receive signals from sensors and control elements of different vehicle devices, evaluate the signals, and trigger the vehicle devices to initiate specific functions. Some functions in the vehicle require multiple vehicle devices to be triggered simultaneously, such as ambient lighting and air conditioning, to, for example, prepare the vehicle for commissioning; an access control system and corresponding presence detection sensors and/or motion detection sensors; a motor control and sensors for motor pressure, rotational speeds or temperatures, etc. In such cases, it may be necessary to synchronously retrieve the signals from various sensors. For this reason, the clocks of the multiple control devices must be synchronized. In doing so, it must be ensured that the synchronization is authentic with regard to cybersecurity. Methods for synchronizing clocks of multiple devices usually require an exchange of multiple messages between the control devices. In systems with a slow and/or a cryptography with poorly predictable run times, an individual authentication of the individual messages cannot be performed and/or cannot be performed quickly enough and/or cannot be performed securely enough.

SUMMARY

A need exists to provide improved methods, devices, and systems for synchronizing clocks of at least two devices in a distributed network of a vehicle, which method overcomes the aforementioned disadvantages at least partially.

The need is addressed by a method for synchronizing clocks of at least two devices in a distributed network of a vehicle according to the independent method claim(s), a computer program product for performing a method according to the independent computer program product claim(s), a corresponding network for a vehicle according to the independent system claim(s), and a vehicle with a corresponding network according to the independent device claim(s).

Embodiments of the invention are described in the dependent claims, the following description, and the drawings.

DESCRIPTION

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In the exemplary embodiments described herein, the described components of the embodiments each represent individual features that are to be considered independent of one another, in the combination as shown or described, and in combinations other than shown or described. In addition, the described embodiments can also be supplemented by features of the invention other than those described.

A first exemplary aspect provides: a method for synchronizing clocks (may also be referred to as time sensors, clock generators, and/or clock counters) of at least two devices, for example comprising a first device and a second device, e.g., in the form of control devices, for example in the form of control devices of individual or multiple sensors and/or devices and/or assistance systems of a vehicle, in a distributed network of the vehicle, comprising the following, which may for example be performed in two phases:

(Phase 1, unencrypted, or not authenticated, serves to synchronize the clocks):

establishing unencrypted communication between the at least two devices to determine a temporal difference between the clocks of the at least two devices, exchanging messages, comprising, for example, at least one query (as a message) from the first device to the second device and a response (as a message) from the second device to the first device or multiple queries and responses, between the at least two devices via the unencrypted communication, wherein, for example, the messages serve to synchronize clocks of the at least two devices, for example, in accordance with Cristian's algorithm, and/or wherein for example the messages are provided with time stamps for calculating periods or round-trip times between sending a query and obtaining a corresponding response, for example, determining a period or a round-trip time of a message pair of the messages, for example of a suitable message pair, the period of which for example corresponds to a desired precision for the synchronization, ascertaining a temporal difference (may also be referred to as an offset) between the clocks of the at least two devices using the messages, for example using the determined period, for example of the suitable message pair, for example, on the first device of the at least two devices which is, for example, activated first (and/or on the second device);

(Phase 2, encrypted, serves to subsequently authenticate the synchronization):

establishing encrypted communication between the at least two devices to authenticate the exchange of messages, authenticating the messages that were used to ascertain the temporal difference, for example that were exchanged up to the ascertaining of the temporal difference, for example by exchanging and comparing hash values for the sent messages and/or received messages to the at least two devices, wherein, for example, the hash values are mapped, exchanged, and/or compared together or separately for the sent messages and/or received messages on the at least two devices, for example via the encrypted communication or still via the unencrypted communication, using the ascertained temporal difference as a synchronization result by at least one of the at least two devices or by both devices, when the authentication of exchanged messages has been completed successfully.

In the context of the teachings herein, it is conceivable that each device of the at least two devices may ascertain the temporal difference itself. For this purpose, it may furthermore be provided that the ascertained temporal difference between the at least two devices is exchanged, for example via the encrypted communication.

It is also conceivable that only one device, which, for example, is active first, may ascertain the temporal difference as a central control device (known as a time server). For this purpose, it may furthermore be provided that the calculated temporal difference (dt) is transmitted from this device, which ascertained the temporal difference, to the other device of the at least two devices, for example via the encrypted communication. If the central control device is referred to as the first device, at least one additional step may be provided some embodiments:

transmitting the ascertained temporal difference from the first device to the second device of the at least two devices, for example via the encrypted communication.

The steps of the method, for example within the individual phases, may be performed in the specified order or in a modified order. In some embodiments, the steps of the method may be performed at least partially simultaneously, offset from one another, or one after the other. In some embodiments, the steps of the method, for example comprising both phases, may be performed repeatedly to enable recurring synchronization of the clocks. For example, the method may be performed periodically and/or at regular time intervals.

An authentication within the context of the teachings herein means proof (or verification) that the message has come from an authorized sender and that the message is not falsified. The first device may prove its authenticity to the second device. The second device may then attest or verify the alleged authenticity to the first device. The authentication process of the method may be referred to in the context of the teachings herein as an authentication.

A possible algorithm for synchronizing clocks, such as Cristian's algorithm, for phase 1 is based on an exchange of messages. Each message contains a time stamp. By comparing the time stamps (and/or the arrival and/or sending times) of the messages, the relative temporal difference between the clocks is calculated. This temporal difference is the synchronization result. Each message exchange has a certain delay, known as a round-trip time, in order to get from the sending device in the form of a query to the destination and back from the destination in the form of a response. The queries and responses in the context of the teachings herein may have the same content or different contents. The round-trip time may also have a certain jitter, which may also be referred to as the temporal clock jitter in the transmission of digital signals. This may for example be taken into account in the evaluation. To compensate for an unequal run speed of the clocks, also referred to in the following as clock drift, the synchronization that has been established may be monitored and updated from time to time.

During the synchronization, not only one query and one response may be sent in some embodiments, but rather multiple queries and multiple responses. From the multiple queries and corresponding responses, such a message pair is waited for and selected, according to Christian's method, which has a desired period that is below a specific threshold. By determining this threshold, a desired precision for the synchronization is established. The tolerable wait time and then the acceptable period is a question of the desired precision, the system knowledge, and statistics.

To protect the time synchronization from manipulation, the entire message sequence may be authenticated in some embodiments. According to the teachings herein, the authentication takes place subsequently in phase 2, after the result, or the synchronization result, has been obtained in phase 1.

An idea in this case is that the exchange of messages (queries or responses) first takes place without authentication. Each device records which messages it sends and which messages it receives. Finally, the time offset of the clocks is derived from the exchange of the messages. Then the devices establish an authenticated communication. In this manner, the, for example all, previous messages are mutually verified, or checked for integrity, using the recordings and thus authenticated. If the authentication is successful, the resulting offset is used for the synchronization. If the authentication fails, the result is discarded. In this case, the method may be repeated.

In other words, an idea is that the messages that are used for the synchronization are not encrypted during the synchronization. Only an ex post facto authentication is used to validate the previous communication. As a result, the synchronization itself is not disrupted by the overhead of authentication. Since the number of messages is nearly unimportant for the mapping to the hash values, the subsequent authentication of all messages that have been sent for the synchronization may be performed very quickly, simply, and with little computing effort.

The hash values may in some embodiments be formed in each case for all sent and for all received messages on each device individually or together. In this manner, the entire communication may also be protected from an attack by repeating previously recorded messages ("replay attack" or "replay protection," respectively). The communication is protected by the authentication from an attack by a non-authorized middleman ("man-in-the-middle attack"). A common hash value for all sent and for all received messages or two separate hash values, one for all sent and one for all received messages, are calculated on each device. The hash values for all sent messages and/or for all received messages are sent, for example encrypted or also unencrypted, from one device to another device, where the received hash value(s) are compared with the corresponding locally calculated hash value(s) for all received messages and/or for all sent messages. If the corresponding hash values match, the authentication may be referred to as successful. If the authentication fails, the method may be repeated.

A benefit is that the authentication of messages is separated from the technical method of the synchronization. This is possible because processing of a fraudulent message in itself would not cause any damage. Only accepting the result would result in damage. The authentication works as a gatekeeper. It requires additional time but does not disrupt the previous negotiation of the synchronization. The small delay for the authentication in the subsequent use of a trustworthy result is negligibly small.

Furthermore, in a method for synchronizing clocks of at least two devices and in some embodiments, it may be possible for the calculated temporal difference to be discarded if the authentication has failed. In this manner, the manipulative results may be simply and quickly rejected. The cybersecurity in the synchronization of clocks may be ensured as a result.

Furthermore, in a method for synchronizing clocks of at least two devices and in some embodiments, it may be possible for the method to be restarted if the authentication has failed. The synchronization of clocks may therefore be performed despite any cyberattacks that may be attempted.

In addition and in some embodiments, it may be possible if the method is performed periodically, i.e., at specific time intervals, for example, weekly, monthly, or yearly, and/or regularly, i.e., in connection with specific events, such as after each motor start, after a specific time and/or a number of kilometers, as part of an inspection, after an update of at least one device, etc. The method is thus able to compensate for the clock drift of the clocks. Consequently, the synchronization may be monitored and updated from time to time.

Moreover and in some embodiments, it may be possible that the method is started manually by request of a user of the vehicle. The user may thus ensure that the clocks of the devices are synchronized and establish trust in the control and/or operating system of the vehicle. This may also be beneficial for situations in which new devices, such as user-side mobile devices, are coupled to the distributed network of the vehicle.

In some embodiments, the method is automatically initiated by the device, for example the device that is active and/or activated first, of the at least two devices. The time synchronization may thus be automatically performed in the network of the vehicle. It is also conceivable in some embodiments that the method is automatically initiated periodically and/or regularly. In addition and in some embodiments, it may be possible for the method to be automatically started as soon as a new device is coupled to the network of the vehicle.

The method may also be performed to synchronize clocks of more than two devices in some embodiments.

To synchronize clocks of more than two devices, a central control device, known as a time server, may be selected by the more than two devices, which control device triggers the synchronization of all clocks, for example individually or in a group.

On the one hand, a central control device may perform the time synchronization individually with one other device in each case and in some embodiments. This may be of great benefit for peer-to-peer networks.

On the other hand, a central control device may ascertain the local time of multiple secondary devices in some embodiments, if applicable calculate an averaged time of a distributed system with these secondary devices, and send the respective time difference from its own or from the averaged time to these secondary devices as a result (for example, via a broadcast connection or also peer-to-peer), provided that the prior correspondence from phase 1 has been successfully authenticated in phase 2.

Other devices, as second (secondary/client) devices, may also access the first device, as a central control device (primary/server), in order to synchronize themselves with the first device. The message exchange between the respective pairs of devices may be designed so that the offset is calculated only on the second device.

Nevertheless, for the synchronization of clocks of more than two devices it is also conceivable, however, that one central control device (as described above, this may be either a primary or a secondary control device) is selected for each pair of the more than two devices, which control device may initiate and/or trigger the synchronization. This may be beneficial for peer-to-peer networks.

For each of the different functions in the vehicle, two or more devices may be required, which may be time-synchronized in each special network according to a suitable principle, individually or in groups.

In the context of the disclosure, it is conceivable in some embodiments that the method is performed to synchronize clocks of the devices that are integrated into the vehicle and/or that are coupled to the distributed network of the vehicle by a user, such as mobile devices of the user. In this manner, the distributed network may be flexibly put together in the vehicle and securely time-synchronized.

In addition, it is conceivable in some embodiments that the method is performed to synchronize clocks of the devices that are used for a desired vehicle function, for example comprising sensor functions, assistance systems, safety systems, comfort systems, and/or entertainment systems. In this manner, it may be ensured that the devices that are required for a desired vehicle function are securely time-synchronized. The operational security of the vehicle may be considerably increased as a result.

Furthermore and in some embodiments, it may be possible in a method for synchronizing clocks of at least two devices that the unencrypted communication is performed with a cable connection, for example via a bus system, and/or wirelessly, for example via radio. In this manner, existing communication possibilities in the system may be utilized.

The encrypted, or cryptographically secured, communication may in turn be performed using an encryption protocol for secure data transmission, for example Transport Layer Security. This may ensure that the data transmission is secure. A unique individual key for the vehicle may be used for the encryption protocol. This key may also be used to calculate the hash values. It is also conceivable in some embodiments for a special key to be provided for the encrypted communication for subsequent authentication of the time synchronization. The key may also be reset each time the subsequent authentication of the time synchronization between the at least two devices is performed.

Furthermore, in a method for synchronizing clocks of at least two devices and in some embodiments, it may be possible that the messages for synchronizing clocks of at least two devices are stored together or separately in the at least two devices in a common memory or in two different memories in each device for sent messages and/or received messages. The memories may be emptied after each run of the method. In this manner, the formation of the hash values for the sent and/or the received messages may be simplified, wherein the content of the respective memories may be performed by a hash generator to subsequently authenticate the time synchronization.

Furthermore and in some embodiments, in a method for synchronizing clocks of at least two devices, it may be possible that the messages for synchronizing clocks of the at least two devices are provided with indicators, for example, in the form of counters. In this manner, it may be ensured that the messages are stored in an organized order.

As already explained above and in some embodiments, it may be possible that hash values for the sent messages and/or received messages are compared on the at least two devices to authenticate the messages that were used to ascertain the temporal difference, for example that were exchanged up until the calculation of the temporal difference. The formation of hash values represents a simple, quick, and resource-saving method of checking the integrity of the exchanged messages and thus ensuring that the messages came from an authorized sender. In other words, this may enable a simple, quick, and resource-saving authentication of the messages. Additional security from cyberattacks may be enabled by exchanging the hash values via the encrypted communication to perform a comparison of the respective hash values.

In some embodiments, each device of the at least two devices may map all sent messages and all received messages to one common hash value or to two separate hash values. When forming the hash values, a key may be used which may match with a key for the encrypted communication between the at least two devices or which may be selected especially for the mapping of hash values. In this manner, the entire communication up to the determination of a suitable message pair with a suitable period may be authenticated simply and quickly and with little computing effort.

If the sent messages and the received messages are mapped to a common hash value and in some embodiments, at least one of the following may be performed to perform phase 2, or to authenticate the used or exchanged messages:
  sending a common hash value for all sent messages and all received messages of at least one (first or primary, or second or secondary) device to another device (accordingly second or secondary, or first or primary) of the at least two devices, for example via the encrypted communication,
  comparing the received common hash value with a calculated common hash value for all received messages and all sent messages on the other device, and/or
  determining that the authentication has been successfully completely when the comparison of the received common hash value with a calculated common hash value on the other device results in a match.

In this manner, it may be checked concurrently whether the content of the messages sent in each case and the corresponding received messages matches.

If the sent messages and the received messages are mapped to two separate hash values and in some embodiments, at least one of the following may be performed to perform phase 2, or to authenticate the exchanged messages:

sending a hash value for all sent queries that were calculated by the first device from the first device to the second device, for example via the encrypted communication,
  receiving the sent hash value on the second device,
  comparing the received hash value for all sent queries with a calculated hash value for all received queries on the second device.

In this manner, it may be checked whether the sent queries from the first device to the second device match with the queries actually received by the second device.

In addition thereto and in some embodiments, at least one of the following may be performed to authenticate the exchanged messages:
  sending a hash value for all sent responses that were calculated by the second device from the second device to the first device, for example via the encrypted communication,
  when the comparison of the received hash value for all sent queries with the calculated hash value for all received queries on the second device results in a match,
  receiving the sent hash value on the first device,
  comparing the received hash value for all sent responses with a calculated hash value for all received responses on the first device.

In this manner, it may be checked whether the sent responses from the second device to the first device match with the received queries on the first device.

In some embodiments, at least one of the following may be performed:
  determining that the authentication has been completed successfully,
  when the comparison of the received hash value for all sent responses with the calculated hash value for all received responses results in a match.

Thus, the time synchronization may be completed after a successful synchronization and the result of the synchronization, namely the temporal difference between the clocks calculated on the first device, may then be used and, if applicable, transmitted to the second device.

In a second exemplary aspect, a computer program product is provided, comprising commands that, during the execution, for example of the computer program, by a processor, cause the processor to perform the method, which may run as described above. The computer program product may be provided, for example, on a carrier, such as a disk or another carrier. The computer program product may also be provided in the form of an update, with or without a carrier, for the vehicle.

In a third exemplary aspect, a network for a vehicle is provided, comprising at least two devices, wherein at least one device of the at least two devices has the following elements: a storage unit in which a computer program is saved, and a processor that is configured so that the processor, when executing the computer program, performs the method, which may run as described above. Using In a fourth exemplary aspect a vehicle with a network is provided, which may be executed as described above.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

Figure 1:
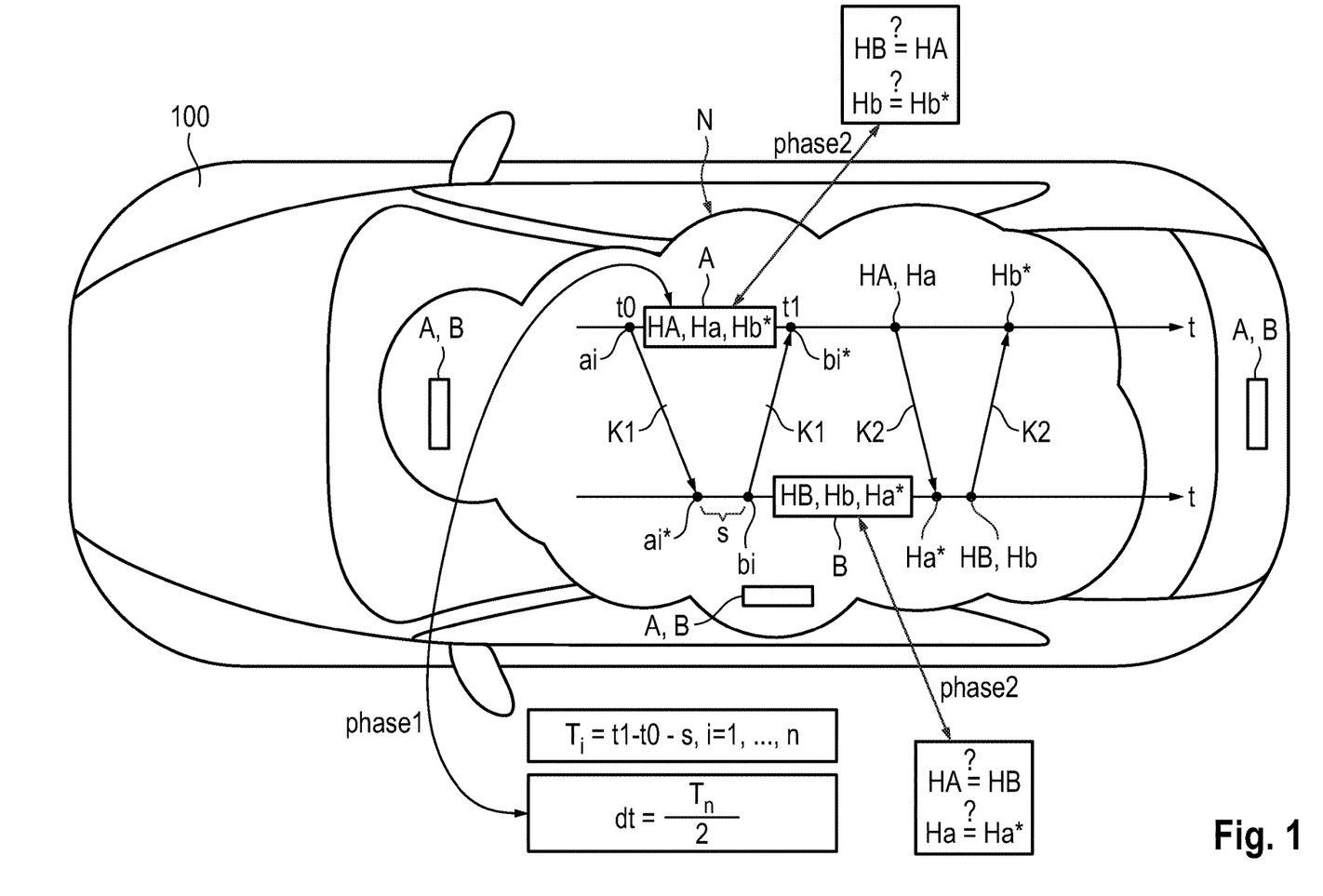
FIG. 1 shows an example map representation to visualize an embodiment of a method for synchronizing clocks.
Figure 2:
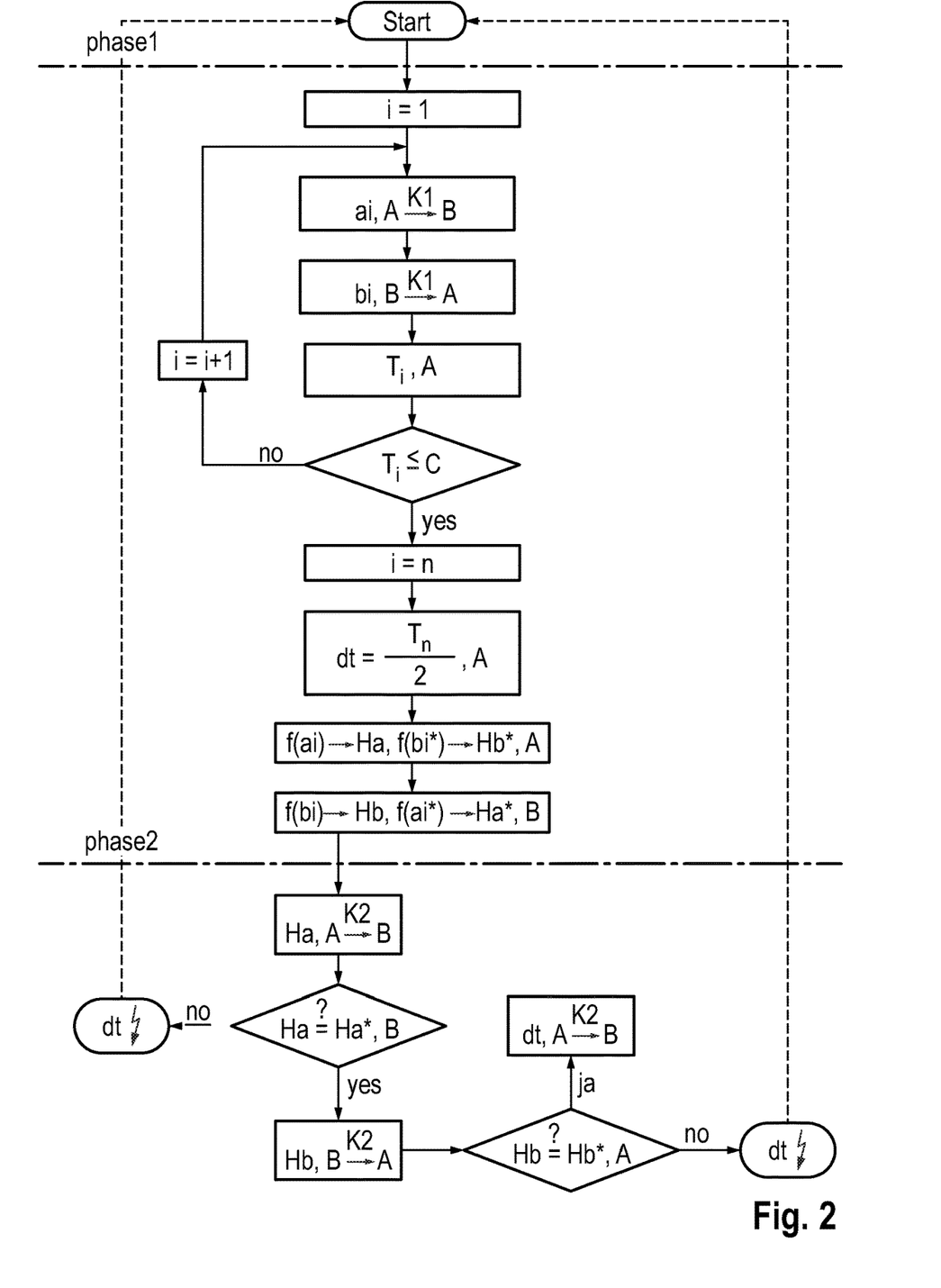
FIG. 2 shows an example flow chart of an embodiment of a method for synchronizing clocks.

FIGS. 1 and 2 serve to illustrate a method for synchronizing clocks of at least two devices A, B, for example comprising a first device A and second device B, for example in the form of control devices of individual or multiple sensors and/or devices of the vehicle 100, in a distributed network N of a vehicle 100. The method may be performed in two phases 1, 2: a phase 1 for synchronizing clocks and a following phase 2 for subsequently authenticating the synchronization.

Phase 1, which takes place unencrypted and thus non-authenticated and serves to synchronize clocks, comprises the following steps:

establishing unencrypted communication K1 between the at least two devices A, B to determine a temporal difference dt between the clocks of the at least two devices A, B, exchanging messages ai, bi, comprising, for example, at least one query ai from the first device A to the second device B and a response bi from the second device B to the first device A or multiple queries ai and responses bi, between the at least two devices A, B via the unencrypted communication K1, wherein for example the messages ai, bi serve to synchronize clocks of the at least two devices A, B, for example, using Cristian's algorithm, and/or wherein for example the messages ai, bi are provided with time stamps for calculating periods Ti or round-trip times between sending a query ai and obtaining a corresponding response bi, if applicable, determining a, e.g. suitable, message pair an, bn from the messages ai, bi with a period Tn that corresponds, for example, to a desired precision for the synchronization, ascertaining, for example calculating, a temporal difference dt, or an offset, between the clocks of the at least two devices A, B using the messages ai, bi, for example using the period Tn of the determined message pair an, bn, on at least one of the at least two devices A, B, for example on a first device A of the at least two devices A, B which is, for example, active first, or on each of the at least two devices A, B.

Phase 2, which takes place encrypted and serves to subsequently authenticate the synchronization, comprises the following steps:

establishing encrypted communication K2 between the at least two devices A, B to authenticate the exchange of messages ai, bi, authenticating the messages ai, bi that were used to ascertain the temporal difference dt, for example that were exchanged up to the ascertaining of the temporal difference dt, for example by exchanging and comparing hash values HA, HB, Ha, Ha*, Hb, Hb* for the sent messages ai, bi and/or received messages ai*, bi* on the at least two devices A, B, wherein for example the hash values HA, HB, Ha, Ha*, Hb, Hb* are mapped and/or exchanged together or separately for the sent messages ai, bi and/or received messages ai*, bi* on the at least two devices A, B, for example via the encrypted communication K2 or also, however, unencrypted, using the ascertained temporal difference dt as a synchronization result by at least one of the at least two devices A, B or by both devices A, B, when the authentication of exchanged messages ai, bi has been completed successfully.

In the context of the teachings herein, it is conceivable that each device A, B of the at least two devices A, B may ascertain the temporal difference dt itself.

However, it is also conceivable that only one device A, B, for example, the first device A, of the at least two devices A, B may ascertain the temporal difference dt as a central control device (known as a time server). In the latter case, at least one additional step may be provided:

transmitting the ascertained temporal difference dt from the first device A to the second device B of the at least two devices A, B, for example via the encrypted communication K2.

FIG. 1 shows a possible embodiment in which one device acts in the function of the first device A, which, for example, is active first, and one device acts in the function of the second device B.

The first device A sends a query ai to the second device B at time t0. The second device B receives the query ai in the form of a received query ai*. The second device B does not yet know whether the received query ai* is authentic and/or whether it actually originates from the first device A. After a potential processing time s, the second device B sends a response bi to the first device A. The first device A receives the response bi in the form of a received response bi*. The first device A does not yet know whether the received response bi* is authentic and/or whether it actually originates from the second device B.

A possible algorithm for synchronizing clocks in phase 1 is, for example, Cristian's algorithm. Each message ai, bi is provided with a time stamp, for example by the sending device and/or by the receiving device. By comparing the time stamps and/or the sending and/or arrival times t0, t1 of the messages ai, bi, the relative temporal difference dt between the clocks of the at least two clocks A, B is calculated. For this purpose, what is known as the period Ti, as shown by way of example in FIG. 1, is calculated.

This temporal difference dt is the synchronization result.

The queries ai and the responses bi in the context of the teachings herein may have the same content or different contents.

The round-trip time Ti may also have a certain jitter, known as temporal clock jitter. This may be taken into account in the evaluation. To compensate for a clock drift, the synchronization that has been established may be monitored and updated from time to time.

As indicated in FIG. 2, not only one query ai and one response bi are sent during the synchronization, but rather multiple queries ai and multiple responses bi. From the multiple queries ai and corresponding responses bi, such a message pair an, bn is waited for and selected which has a desired period Tn that is below a specific threshold C. The threshold C may be individually set depending on the vehicle function. Security-related vehicle functions may be characterized with a lower threshold C. Entertainment functions can, on the other hand, allow a higher threshold C.

To protect the result of the synchronization, namely the temporal difference dt, from cyberattacks, for example man-in-the-middle attacks, the entire message sequence up to the completed synchronization may be authenticated.

Within the scope of the teachings herein, the authentication takes place subsequently in phase 2, after the result, the synchronization result, already exists in phase 1.

The teachings herein provide that the exchange of messages ai, bi in phase 1 takes place non-authenticated, or unencrypted. Each device A, B records which messages it sends and which messages it receives. For this purpose, a common memory or two separate memories may be provided on each device A, B. Finally, the time offset of the clocks is derived from the exchange of the messages ai, bi.

After the completion of phase 1, the devices A, B establish an authenticated communication K2 in phase 2. In this manner, the, for example all, previous messages ai, bi are mutually verified and thus authenticated using the recordings. If the authentication is successful, the resulting offset is used for the synchronization. If the authentication fails, the result is discarded. In this case, the method may be repeated.

Beneficially, the messages ai, bi that are required for synchronization are not encrypted during phase 1. In phase 2, an ex post facto authentication is performed to validate the previous communication K1.

It may thus be achieved that the synchronization in phase 1 is not disrupted by the barely predictable time delay of the cryptographic authentication (also called "overhead") for the individual messages ai, bi.

Since the number of messages ai, bi is of no importance for the mapping to the hash values HA, HB, Ha, Hb, Ha*, Hb*, the subsequent authentication of all messages ai, bi that were sent in phase 1 may be performed very quickly, simply, and with little computing effort. The hash values HA, HB, Ha, Hb, Ha*, Hb* are each formed for all sent messages ai, bi and/or for all received messages ai*, bi* on each device A, B. A common hash value HA, HB or two separate hash values Ha, Hb* or Hb, Ha* are thus calculated on each device A, B.

In FIG. 2, a possible exemplary embodiment is shown in which two separate hash values Ha, Hb* or Hb, Ha* are calculated on each device A, B. In phase 2, the hash value Ha is sent for all sent messages ai from the first device A, for example, already encrypted or still unencrypted, to the second device B. On the second device B, the received hash value Ha is compared with the locally calculated hash value Ha* for all received messages ai*. If the two hash values Ha, Ha* match, the hash value Hb is sent for all sent messages bi from the second device B, for example, already encrypted or still unencrypted, to the first device A. The received hash value Hb is compared there with the locally calculated hash value Hb* for all received messages bi*. If this comparison is also successful, the authentication may be considered successful. If the authentication fails, the calculated temporal difference dt may be discarded and/or the method may be repeated.

As FIG. 1 indicates, however, it is also conceivable that only one common hash value HA, HB is calculated for all sent messages ai, bi and/or for all received messages ai*, bi* on each device A, B, wherein the sent messages ai, bi and/or the received messages ai*, bi* are stored in a corresponding order (for example, ai, bi* or ai*, bi) on the respective device A, B. In this case, only the common hash value HA, HB may still be mutually verified to authenticate the messages ai, bi that served for the time synchronization. A procedure of the authentication with the common hash value HA, HB is not shown in FIG. 2 simply for reasons of simplicity.

As FIG. 1 indicates, the method may be performed to synchronize clocks of more than two devices A, B. For this purpose, a central control device (known as a time server) of the more than two devices A, B may be selected which triggers the synchronization of all clocks, for example individually or in groups. On the one hand, a central control device may perform the time synchronization individually with one other device in each case, which may be of great benefit for peer-to-peer networks.

On the other hand, a central control device A may ascertain the local time of multiple secondary devices and send the respective time difference dt from its own or from an averaged time to these secondary devices as a result of the synchronization (for example, broadcast or peer-to-peer), provided that the prior correspondence from phase 1 has been successfully authenticated in phase 2.

Other devices, as second (secondary/client) devices B may also access the first device A, as a central control device (primary/server), in order to synchronize themselves with the first device A. The message exchange of the devices A, B may be designed so that the offset dt is calculated only on the second device B. Nevertheless, an exchange of messages is always required, which may initially remain cryptographically unsecured in the context of the teachings herein, but are then authenticated before the use of the synchronization result.

It is thus conceivable for the synchronization of clocks of more than two devices A, B that a central control device (known as a local time server) may be selected for each pair of the more than two devices A, B to initiate the synchronization. This may be beneficial for peer-to-peer networks.

For each of the different functions in the vehicle 100, two or more devices may be required, which may be time-synchronized in each special distributed network N according to a suitable principle, individually or in groups.

For example, control devices of individual or combined devices in the vehicle 100 are conceivable as devices A, B. The following are possible as devices A, B: Devices that are integrated into the vehicle 100 and/or that may be coupled with the distributed network N of the vehicle 100 by a user, such as mobile devices M of the user.

The method may be performed to synchronize the devices A, B that are required for a desired vehicle function.

In the context of the teachings herein, sensor functions, assistance functions, safety systems, comfort systems, and/or entertainment systems are conceivable as vehicle functions.

The unencrypted communication K1 may be performed, for example, with a cable connection, for example via a bus system, and/or wirelessly, for example via radio. With these, existing communication possibilities in the vehicle 100 may be utilized flexibly.

The encrypted communication K2 may in turn be performed using an encryption protocol for secure data transmission, for example Transport Layer Security (TLS).

As already explained above, the messages ai, bi for synchronizing clocks of the at least two devices A, B may be stored in the at least two devices A, B in a common memory or separately in two different memories for sent messages ai, bi and/or received messages ai*, bi*. The respective memories may be emptied after each run of the method.

The messages ai, bi may be provided with indicators, for example in the form of counters, to be able to store the messages ai, bi in an organized order.

As FIG. 2 illustrates, each device of the at least two devices A, B may map all sent messages ai, bi and all received messages ai*, bi* to two corresponding hash values Ha, Ha*, Hb, Hb*. Not shown in FIG. 2, simply for reasons of simplicity, is the additional possibility in which all sent messages ai, bi and all received messages ai*, bi* are mapped on the devices A, B to only one common hash value HA, HB per device A, B. In this manner, what is known as replay protection may be ensured and man-in-the-middle attacks may be reliably avoided. When forming the hash values Ha, Ha*, Hb, Hb*, a key may be used which may match with a key for the encrypted communication K2 between the at least two devices A, B or which may be selected especially for the mapping of hash values. In this manner, the entire communication up to the determination of a suitable message pair an, bn with a suitable period Tn may be authenticated simply and quickly and with little computing effort.

As FIG. 2 also illustrates, the following steps may be performed to perform phase 2, or to authenticate the exchanged messages ai, bi:

sending a hash value Ha for all sent queries ai that were calculated by the first device A from the first device A to the second device B, for example via the encrypted communication K2, receiving the sent hash value Ha on the second device B, comparing the received hash value Ha for all sent queries ai with a calculated hash value Ha* for all received queries ai* on the second device B, sending a hash value Hb for all sent responses bi that were calculated by the second device B from the second device B to the first device A, for example via the encrypted communication K2, when the comparison of the received hash value Ha for all sent queries ai with the calculated hash value Ha* for all received queries ai* on the second device B results in a match, receiving the sent hash value Hb on the first device A, comparing the received hash value Hb for all sent responses bi with a calculated hash value Hb* for all received responses bi* on the first device A, and/or determining that the authentication has been completed successfully, when the comparison of the received hash value Hb for all sent responses bi with the calculated hash value Hb* for all received responses bi* results in a match.

If the sent messages ai, bi and the received messages ai*, bi* are mapped to a common hash value HA, HB (cf. FIG. 1), at least one of the following steps may be performed to perform phase 2, or to authenticate the time synchronization:

sending a common hash value HA or HB for all sent messages ai, bi and all received messages ai*, bi* from at least one device to another device of the at least two devices A, B, for example via the encrypted communication K2, comparing the received common hash value HA or HB with a calculated common hash value HB or HA for all received messages ai*, bi* and all sent messages ai, bi on the other device, and/or determining that the authentication has been completed successfully when the comparison of the received common hash value HA or HB with a calculated common hash value HB or HA on the other device results in a match.

A corresponding computer program product, comprising commands that, during the execution, for example of the computer program, by the processor cu, cause the processor cu to perform the method, which may run as described above is also an aspect of the teachings herein.

A corresponding network N for a vehicle 100, comprising at least two devices A, B, wherein at least one device of the at least two devices A, B has the following elements: a storage unit mu in which a computer program is saved, and a processor cu that is configured so that the processor cu, when executing the computer program, performs the method, which may run as described above is also an aspect of the teachings herein.

A corresponding vehicle 100 with a network N which may be executed as described above is also an aspect of the teachings herein.

LIST OF REFERENCE NUMERALS

100 Vehicle
1 Phase
2 Phase
A Device
B Device
M Mobile device
N Network
ai, bi (Sent) messages
ai (Sent) query
bi (Sent) response
ai*, bi* (Received) messages
ai* (Received) query
bi* (Received) response
an, bn Suitable message pair
an Query of a suitable message pair
bn Response of a suitable message pair
Ti Period
Tn Period with a desired precision
C Threshold
t0 Sending time
t1 Arrival time
dt Temporal difference
K1 Unencrypted communication
K2 Encrypted communication
HA Common hash value
HB Common hash value
Ha Hash value for all sent queries
Ha* Hash value for all received queries
Hb Hash value for all sent responses
Hb* Hash value for all received responses
cu Processor
mu Storage unit The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for synchronizing clocks of at least two devices fora distributed network of a vehicle, comprising:
establishing unencrypted communication between the at least two devices to determine a temporal difference between the clocks of the two devices;

exchanging messages between the at least two devices via the unencrypted communication;
ascertaining a temporal difference between the clocks of the at least two devices using the messages;
establishing encrypted communication between the at least two devices to authenticate the exchange of messages;
authenticating the messages that were used to ascertain the temporal difference;
using the ascertained temporal difference as a synchronization result by at least one of the at least two devices when the authentication of exchanged messages has been completed successfully.

2. The method of claim 1, comprising one or more of:
discarding the calculated temporal difference if the authentication fails, and
restarting the method if the authentication fails.

3. The method of claim 1, comprising one or more of:
performing the method periodically or regularly;
starting the method manually by request of a user of the vehicle; and
automatically initiating the method by one device of the at least two devices, which one device is active or activated first.

4. The method of claim 1, wherein the method is performed to synchronize clocks of more than two devices;
wherein a central control device of the more than two devices is selected, which central control device triggers the synchronization of all clocks, and/or
wherein, for each pair of the more than two devices, one central control device is selected, which central control device triggers the synchronization.

5. The method of claim 1, wherein
the method is performed to synchronize clocks of the devices that are integrated into the vehicle and/or that are coupled with the distributed network of the vehicle by a user, and/or
the method is performed to synchronize clocks of the devices that are used for a desired vehicle function.

6. The method of claim 1, wherein
the unencrypted communication is performed with a cable connection and/or wirelessly, and/or
the encrypted communication is performed using an encryption protocol for secure data transmission.

7. The method of claim 1, wherein
the messages are stored in the at least two devices in a common memory or separately in two different memories for sent messages and/or received messages, and/or
the messages are provided with indicators.

8. The method of claim 1, wherein to authenticate the messages that were used to ascertain the temporal difference, hash values for the sent messages and/or received messages on the at least two devices are compared.

9. The method of claim 1, wherein each device of the at least two devices maps all sent messages and all received messages to one common hash value or to two separate hash values.

10. The method of claim 1, wherein
at least one of the following is performed to authenticate the used messages:
sending a common hash value for all sent messages and all received messages from at least one device to another device of the at least two devices;
comparing the received common hash value with a calculated common hash value for all received messages and all sent messages on the other device; and
determining that the authentication has been completed successfully when the comparison of the received common hash value with a calculated common hash value on the other device results in a match.

11. The method of claim 1, wherein
at least one of the following is performed to authenticate the used messages:
sending a hash value for all sent queries that were calculated by the first device from a first device to a second device of the at least two devices;
receiving the sent hash value on the second device; and
comparing the received hash value for all sent queries with a calculated hash value for all received queries on the second device.

12. The method of claim 1, wherein
at least one of the following is performed to authenticate the exchanged messages:
sending a hash value for all sent responses that were calculated by the second device from the second device to the first device, when the comparison of the received hash value for all sent queries with the calculated hash value for all received queries on the second device results in a match;
receiving the sent hash value on the first device;
comparing the received hash value for all sent responses with a calculated hash value for all received responses on the first device; and
determining that the authentication has been completed successfully, when the comparison of the received hash value for all sent responses with the calculated hash value for all received responses results in a match.

13. The method of claim 1, comprising one or more of:
performing the method periodically or regularly;
starting the method manually by request of a user of the vehicle; and
automatically initiating the method by one device of the at least two devices, which one device is active or activated first.

14. The method of claim 2, wherein
the method is performed to synchronize clocks of more than two devices;
wherein a central control device of the more than two devices is selected, which central control device triggers the synchronization of all clocks, and/or
wherein, for each pair of the more than two devices, one central control device is selected, which central control device triggers the synchronization.

15. The method of claim 3, wherein
the method is performed to synchronize clocks of more than two devices;
wherein a central control device of the more than two devices is selected, which central control device triggers the synchronization of all clocks, and/or
wherein, for each pair of the more than two devices, one central control device is selected, which central control device triggers the synchronization.

16. The method of claim 2, wherein
the method is performed to synchronize clocks of the devices that are integrated into the vehicle and/or that are coupled with the distributed network of the vehicle by a user, and/or
the method is performed to synchronize clocks of the devices that are used for a desired vehicle function.

17. The method of claim 3, wherein
the method is performed to synchronize clocks of the devices that are integrated into the vehicle and/or that are coupled with the distributed network of the vehicle by a user, and/or
the method is performed to synchronize clocks of the devices that are used for a desired vehicle function.

18. The method of claim 1, comprising using the ascertained temporal difference as a synchronization result by multiple devices of the at least two devices when the authentication of exchanged messages has been completed successfully.

19. A non-transitory storage medium comprising commands that when executed by a processor, cause the processor to perform:
    establishing unencrypted communication between the at least two devices to determine a temporal difference between the clocks of the two devices;
    exchanging messages between the at least two devices via the unencrypted communication;
    ascertaining a temporal difference between the clocks of the at least two devices using the messages;
    establishing encrypted communication between the at least two devices to authenticate the exchange of messages;
    authenticating the messages that were used to ascertain the temporal difference;
    using the ascertained temporal difference as a synchronization result when the authentication of exchanged messages has been completed successfully.

20. The non-transitory storage medium of claim 19, comprising commands that when executed by a processor, cause the processor to provide the ascertained temporal difference as a synchronization result to one or more other devices of the at least two devices when the authentication of exchanged messages has been completed successfully.

21. A system for a vehicle, comprising at least two devices, wherein at least one device of the at least two devices comprises:
    a data storage in which a computer program is saved; and
    a processor that is configured so that the processor performs the following when executing the computer program:
        establishing unencrypted communication between the at least two devices to determine a temporal difference between the clocks of the two devices;
        exchanging messages between the at least two devices via the unencrypted communication;
        ascertaining a temporal difference between the clocks of the at least two devices using the messages;
        establishing encrypted communication between the at least two devices to authenticate the exchange of messages;
        authenticating the messages that were used to ascertain the temporal difference;
        using the ascertained temporal difference as a synchronization result when the authentication of exchanged messages has been completed successfully.

22. A vehicle with the system of claim 21.

23. The system of claim 21, configured to providing the ascertained temporal difference as a synchronization result to one or more other devices of the at least two devices when the authentication of exchanged messages has been completed successfully.

\* \* \* \* \*